United States Patent [19]

Quad et al.

[11] Patent Number: 4,914,298

[45] Date of Patent: Apr. 3, 1990

[54] INFRARED DETECTOR WITH DIRECTION IDENTIFICATION CAPABILITY

[75] Inventors: Reiner Quad, Taunusstein; Karlheinz Storck, Lorch, both of Fed. Rep. of Germany

[73] Assignee: Heimann GmbH, Fed. Rep. of Germany

[21] Appl. No.: 176,454

[22] Filed: Apr. 1, 1988

[30] Foreign Application Priority Data

Apr. 9, 1987 [DE] Fed. Rep. of Germany ....... 8705296

[51] Int. Cl.$^4$ ................................................. G01S 7/50
[52] U.S. Cl. ...................................... 250/349; 250/342
[58] Field of Search ............. 250/349, 342, 338.3, 250/338.4

[56] References Cited

U.S. PATENT DOCUMENTS

| | | | |
|---|---|---|---|
| 3,536,924 | 10/1970 | Soberman | 250/208 |
| 3,599,001 | 8/1971 | Rolnik | 250/578 |
| 3,657,548 | 4/1972 | Parkin | 250/342 |
| 3,700,905 | 10/1972 | Parkin et al. | 250/349 |
| 3,920,994 | 11/1975 | Cargille | 250/347 |
| 4,009,393 | 2/1977 | Ashley, Jr. et al. | 250/342 |
| 4,166,955 | 9/1979 | Keller | 250/349 |
| 4,179,691 | 12/1979 | Keller | 250/349 |
| 4,227,077 | 10/1980 | Hopson et al. | 250/342 |
| 4,495,408 | 1/1985 | Mori | 250/203 S |
| 4,618,854 | 10/1986 | Miyake et al. | 250/349 |
| 4,625,113 | 11/1986 | Zierhut | 250/342 |
| 4,704,533 | 11/1987 | Rose et al. | 250/342 |
| 4,760,436 | 7/1988 | Yi Zi | 250/338.4 |

FOREIGN PATENT DOCUMENTS

| | | |
|---|---|---|
| 0184747 | 12/1985 | European Pat. Off. . |
| 3404402 | 4/1985 | Fed. Rep. of Germany . |
| 2082009 | 2/1982 | United Kingdom ................ 250/349 |

*Primary Examiner*—Constantine Hannaher
*Attorney, Agent, or Firm*—Hill, Van Santen, Steadman & Simpson

[57] ABSTRACT

An infrared detector includes process and circuitry for detecting the direction of movement of a radiation source with a predetermined resolution. Four radiation-sensitive elements defining a square are provided in the detector, each connected to an evaluation circuit which compares the output signals from the elements. A normalized pulse is generated upon the occurrence of the maximum of the output signal from each of the elements. The direction of movement of the radiation source is identified from the chronological sequence and spacing of the normalized pulses.

2 Claims, 3 Drawing Sheets

| $\varphi$ | SIGNAL SEQUENCE | | | | $\dfrac{t_1}{t_2} > 0.5^*$ |
|---|---|---|---|---|---|
| 0° | 1 | 2,3 | 4 | | X |
| 45° | 1,3 | 2,4 | | | |
| 90° | 3 | 1,4 | 2 | | X |
| 135° | 3,4 | 1,2 | | | |
| 180° | 4 | 2,3 | 1 | | X |
| 225° | 2,4 | 1,3 | | | |
| 270° | 2 | 1,4 | 3 | | X |
| 315° | 1,2 | 3,4 | | | |

| $\varphi$ | SIGNAL SEQUENCE | | | $\frac{t_1}{t_2} > 0.5^*$ |
|---|---|---|---|---|
| 0° | 1 | 2,3 | 4 | X |
| 45° | 1,3 | 2,4 | | |
| 90° | 3 | 1,4 | 2 | X |
| 135° | 3,4 | 1,2 | | |
| 180° | 4 | 2,3 | 1 | X |
| 225° | 2,4 | 1,3 | | |
| 270° | 2 | 1,4 | 3 | X |
| 315° | 1,2 | 3,4 | | |

*)

INFRARED DETECTOR WITH DIRECTION IDENTIFICATION CAPABILITY

BACKGROUND OF THE INVENTION

1. Field of the Invention

The present invention is directed to an infrared detector, and in particular to such a detector having a plurality of radiation-sensitive elements followed by an evaluation circuit.

2. Description of the Prior Art

Infrared detectors are used for identifying sources of infrared radiation for controlling various types of systems, for example, for identifying people to automatically open a door. Conventional infrared detectors do not have the capability of directional interpretation, with the result that every radiation source in the field of view of the detector triggers a control event, for example, every passing person triggers the opening of a door. It is a problem in the art, therefore, to provide an infrared detector having the capability of detecting or identifying the direction of movement of the radiation source, so that control events are triggered only given defined directions of movement.

SUMMARY OF THE INVENTION

It is an object of the present invention to provide an infrared detector including processing circuitry for directional recognition of moving radiation sources based on output signals from the detector.

The above object is achieved in accordance with the principles of the present invention in a radiation detector having four detector elements disposed at the corners of a square. An evaluation circuit connected to the outputs of each of the detector elements includes means for comparing the output signals from the detector elements. The image of a moving infrared source, for example a person, is projected onto the elements by suitable optical means in a sequence dependent upon the direction of movement of the radiation source. The detector is blocked against shortwave radiation by an infrared filter. The detector elements generate typical signal sequences corresponding to the direction of movement, from which the evaluation circuit identifies the direction of movement with a prescribed resolution of, for example, 45°.

DESCRIPTION OF THE PREFERRED EMBODIMENTS

Figure 1:
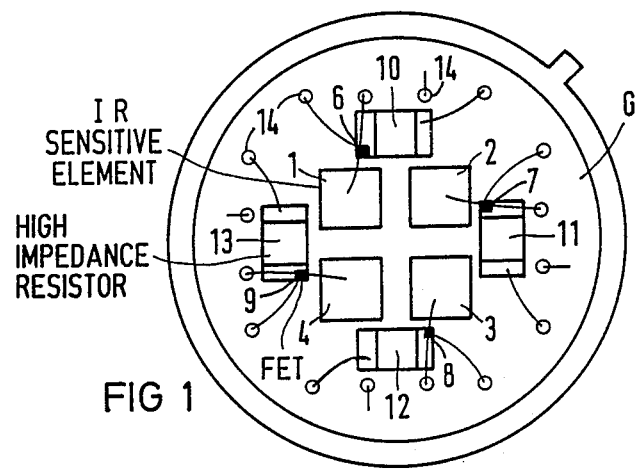
FIG. 1 is a plan view showing the elements of an infrared detector constructed in accordance with the principles of the present invention.

The relevant components of an infrared detector constructed in accordance with the principles of the present invention are shown in FIG. 1. The components are disposed on a base plate G, and include four radiation-sensitive elements 1, 2, 3 and 4 disposed at the corners of a square. The radiation-sensitive elements are interconnected by respective field effect transistors 6, 7, 8 and 9, and respective high-impedance resistors 10, 11, 12 and 13. Connection of the components of the infrared detector ensues by a plurality of pins 14 projecting away from the base plate G.

Figure 2:
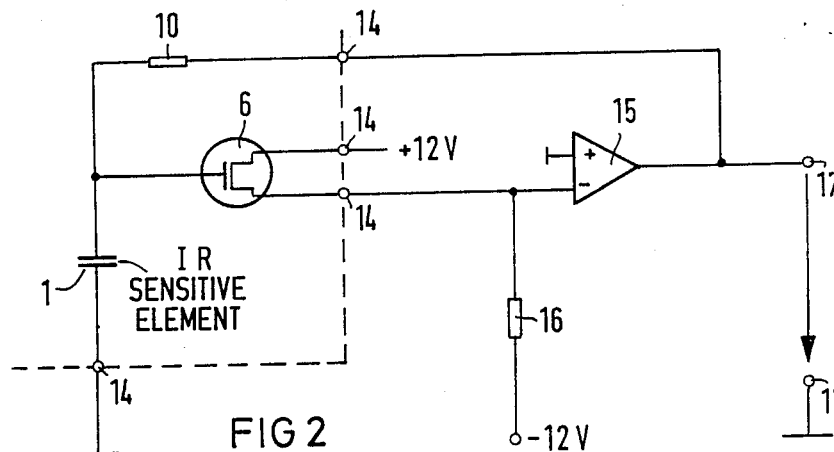
FIG. 2 shows a circuit diagram for one channel of the infrared detector of FIG. 1.

The relevant circuitry for one channel associated with the radiation-sensitive element 1 is shown in FIG. 2. Identical channels are provided for each of the other radiation-sensitive elements. The element 1 is connected to the field effect transistor 6 and the high-impedance resistor 10 as shown, with the terminals of the circuit being connected to pins 14. Outside of the portion of the detector shown in FIG. 1, an operational amplifier 15 connected to a resistor 16 are provided as a signal amplifier having an output voltage between two terminals 17.

Figure 3:
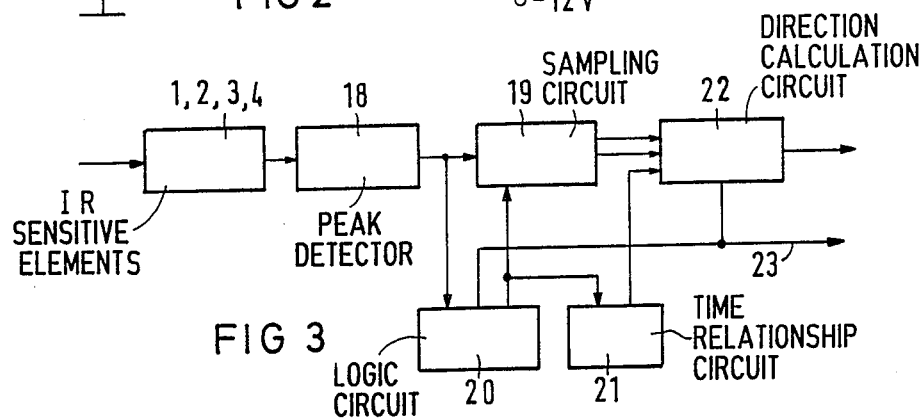
FIG. 3 is a schematic block diagram of the evaluation circuit for use with the detector of FIG. 1.

As shown in FIG. 3, the outputs of the radiation-sensitive elements 1, 2, 3 and 4 are supplied to a peak detector. The output of the peak detector is supplied to a sampling circuit 19 and to a logic circuit 20. The logic circuit 20 generates a signal as described below which is supplied back to the sampling circuit 19, and to a time relationship circuit 21. The sampling circuit 19 supplies two outputs to a direction calculating circuit 22, which is also supplied with an output from the time relationship circuit 21. An "end of sequence" signal is supplied on line 23, as also described in greater detail below.

Figure 4:
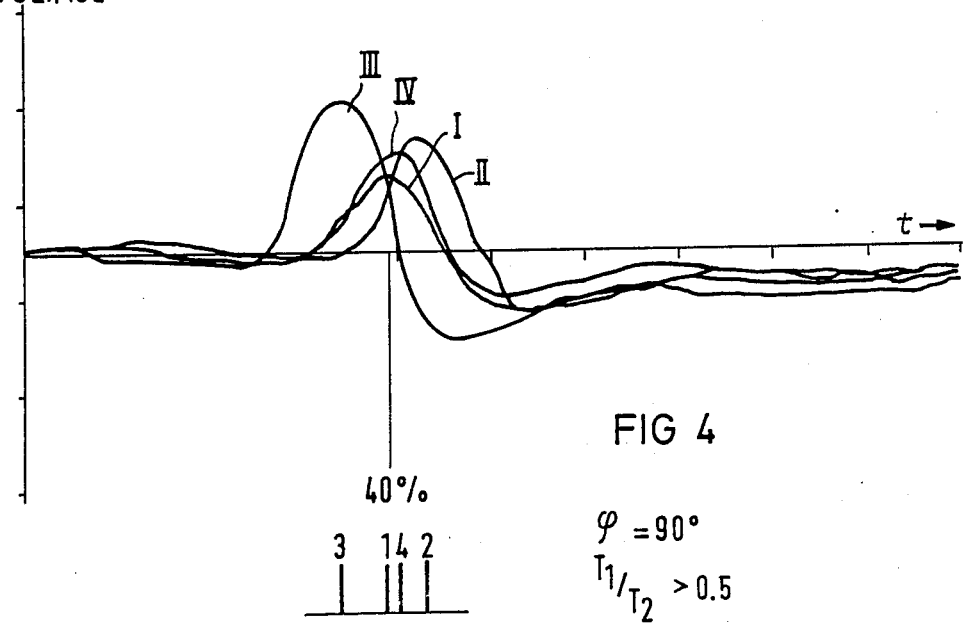
FIGS. 4 and 5 show different chronological curves for output signals of the infrared detector of FIG. 1 for different directions of movement of the radiation source.

The elements, 1, 2, 3 and 4 respectively generate voltage signals at the outputs 17 of the operational amplifier 15 in a chronological sequence dependent on the sequence by which the radiation is imaged onto the elements. For example, FIG. 4 shows the output signals I through IV respectively generated by the elements 1 through 4 for a radiation source moving in a direction at an angle $\phi = 90°$ corresponding to the arrangement schematically shown in FIG. 6. Different curves are generated, as shown in FIG. 5, when the radiation source is moving at an angle $\phi = 45°$.

Figure 5:
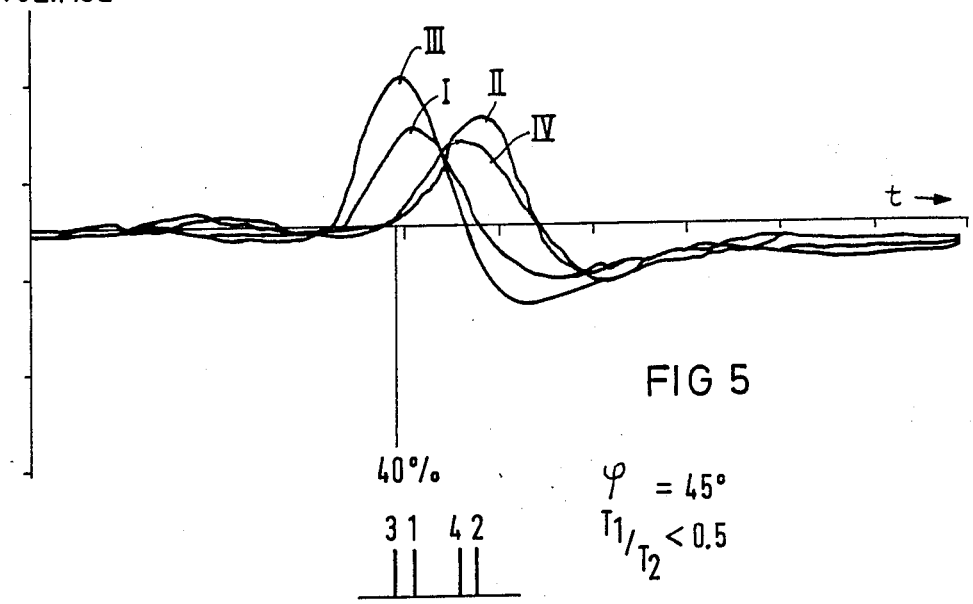

The peak detector 18 identifies the respective maximum value for each of the output signals of the type shown in FIGS. 4 and 5. A normalized pulse is generated when this maximum value of each signal is reached. The normalized pulses for the signals shown in FIGS. 4 and 5 are also shown in those figures in the chronological sequence in which the peaks occur.

The logic circuit 20 generates control pulses for the sampling circuit 19 and for the time relationship detector 21. The logic circuit 20 combines the four normalized pulses on a single line. The logic circuit 20 also detects signal combinations which cannot be evaluated, and in that event supplies an "end of sequence" signal on the line 23.

The chronological sequence of the normalized pulses supplied from the logic circuit 20 is stored in the sampling circuit 19 for use by the direction calculating circuit 22. In the time relationship circuit 21, a linearly rising voltage is started at zero volts upon the occurrence of the first normalized pulse. The voltages on this linearly rising voltage path at the respective times of the second and third normalized pulses are identified and stored. These values correspond to the values $t_1$ and $t_2$ shown in FIG. 7. The time relationship circuit 21 then calculates the quotient of $t_1$ and $t_2$. If this quotient is greater than 0.5, a "high" bit is generated and is forwarded to the direction calculating circuit 22.

The direction calculating circuit 22 identifies the direction of movement of the radiation source from the two signals stored in the sampling circuit 19, and from the bits supplied by the time relationship detector 21. The direction calculating circuit 22 generates a three place binary number which identifies the detected direction within a resolution of 45° at the end of a signal sequence.

Figure 6:
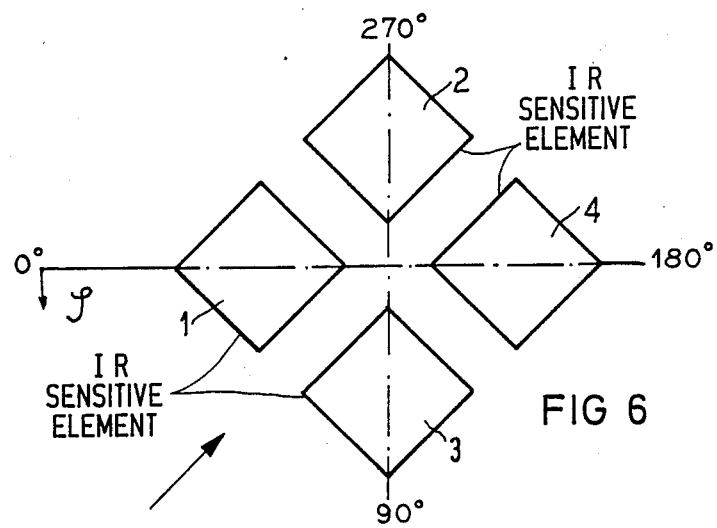
FIG. 6 is a plan view of a portion of the infrared detector of FIG. 1 for explaining the operation thereof.
Figure 7:
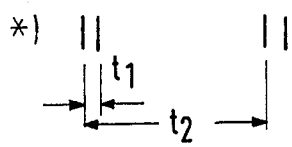
FIG. 7 is a table for explaining the identification of the direction of movement from the output signals of the detector of FIG. 1 processed by the evaluation circuit of FIG. 3.

The various possible signal sequences of the normalized pulses, and the status of the bit determining the chronological relationship are indicated in the table of FIG. 7 for all eight detectable moving directions of FIG. 6, i.e., for all eight steps of the angle $\phi$. A unique sequence of normalized pulses in combination with a defined time relationship bit for each angle $\phi$ are associated with each detectable moving direction. The signal from the direction calculating circuit 22 identifying the direction of movement can then be used by additional processing circuitry to regulate the operation of the system being controlled.

Although modifications and changes may be suggested by those skilled in the art it is the intention of the inventors to embody within the patent warranted hereon all changes and modifications as reasonably and properly come within the scope of their contribution to the art.

We claim as our invention:

1. An infrared detector system comprising:
   a plurality of infrared radiation-sensitive elements disposed at the corners of a square on which radiation from a moving radiation source is incident in a sequence, each infrared radiation-sensitive element generating an output signal corresponding to the radiation incident thereon;
   means for detecting a maximum in the output signal for each infrared radiation-sensitive element and generating a normalized pulse upon the occurrence of said maximum;
   means for generating a series of said normalized pulses for all of said infrared radiation-sensitive elements; and
   means for generating a signal identifying the direction of movement of said radiation source based on the sequence and chronological spacing of said normalized pulses.

2. An infrared detector system as claimed in 1, further comprising means for generating a signal corresponding to the chronological spacing between selected pulses in said sequence of pulses.

* * * * *